United States Patent [19]

Graham et al.

[11] 4,114,836
[45] Sep. 19, 1978

[54] AIRPLANE CONFIGURATION DESIGNED FOR THE SIMULTANEOUS REDUCTION OF DRAG AND SONIC BOOM

[75] Inventors: Blair M. Graham, Rte. 1, Union Hall, Va. 24176; Harry C. Hamrick, Arlington, both of Va.

[73] Assignee: Blair M. Graham, Goldsboro, N.C.

[21] Appl. No.: 775,729

[22] Filed: Mar. 9, 1977

[51] Int. Cl.² ............... B64C 21/02; B64C 1/40
[52] U.S. Cl. ..................... 244/1 N; 181/296; 244/130; 244/204
[58] Field of Search .......... 244/1 N, 130, 204, 208, 244/207; 181/238, 247–249, 296; 416/91; 415/181

[56] References Cited

U.S. PATENT DOCUMENTS

| | | | |
|---|---|---|---|
| 2,152,053 | 3/1939 | Jenkins | 244/204 |
| 2,539,222 | 1/1951 | Battaglia | 244/204 |
| 3,776,489 | 12/1973 | Wen et al. | 244/1 N |
| 3,794,274 | 2/1974 | Eknes | 244/1 N |

*Primary Examiner*—Barry L. Kelmachter

[57] ABSTRACT

A plurality of passageways, each having its longitudinal axis substantially parallel to the flight path of an aircraft, extend through the wings, fuselage, horizontal elevators, and rudder for the purpose of permitting air to pass through these areas. The passageways diverge from front to rear on either side of the longitudinal axis. The front openings leading into the passageways are of such size and so spaced as to exhibit considerable reduction in parasite drag generated at the leading edges of the wings, elevators, and rudder, as well as at the front end of the fuselage.

6 Claims, 5 Drawing Figures

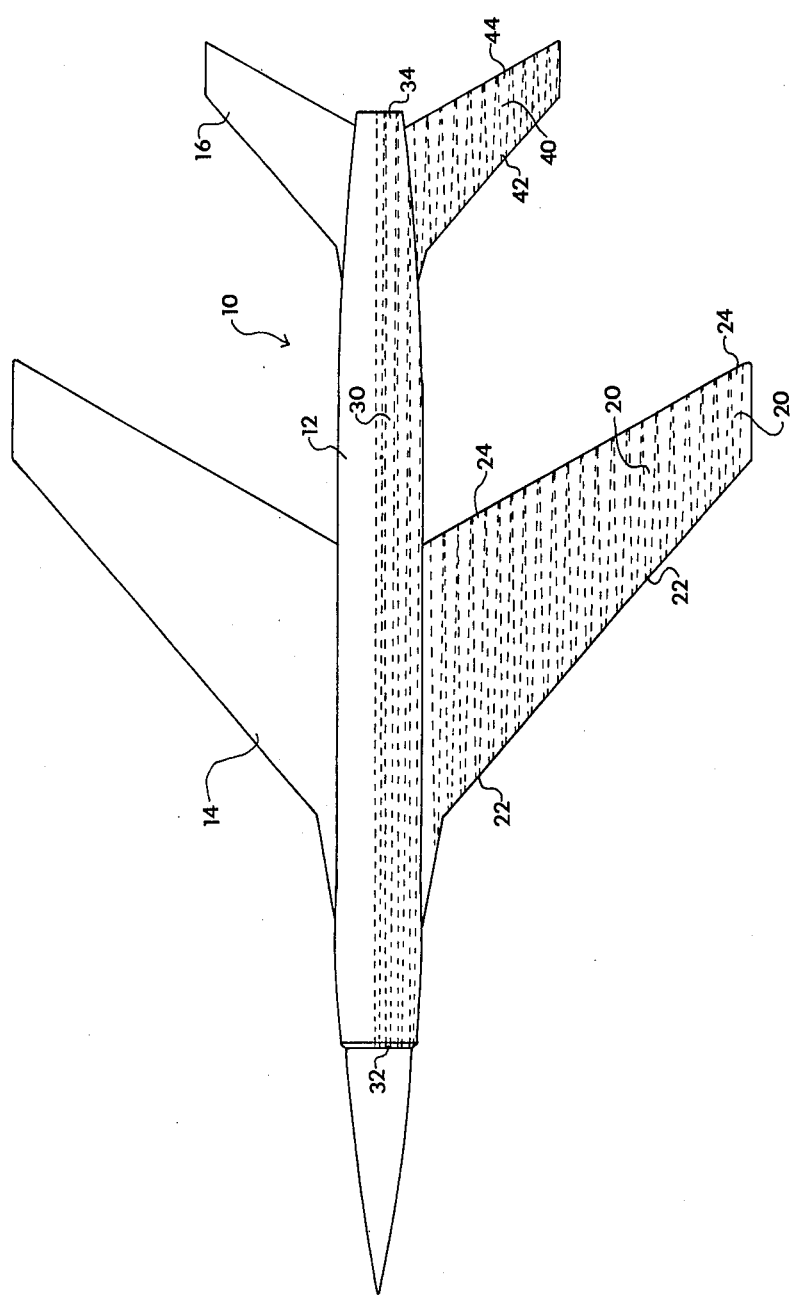
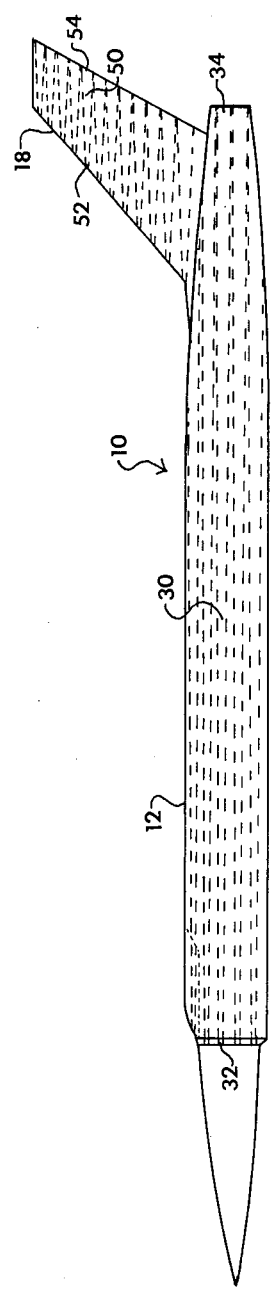
FIG. 1
FIG. 2

AIRPLANE CONFIGURATION DESIGNED FOR THE SIMULTANEOUS REDUCTION OF DRAG AND SONIC BOOM

BACKGROUND OF THE INVENTION

During the development of aircraft, commencing with the late 1950's and up to present day, speeds have increased to the extent that it is no longer out of the ordinary for aircraft to fly faster than the speed of sound (Mach I or greater). Such speeds have led to at least two problems to which considerable attention is being given toward working out the solutions therefor.

One of these problems concerns drag, and more specifically parasite drag which is a function of airplane configuration, altitude, and speed. As the speed of an aircraft approaches Mach I, while induced drag is decreased to almost nil, parasite drag increases remarkably. More specifically, the ratio of parasite drag at two speeds varies as the square of the ratio of the relative speeds. Thus, at supersonic speeds, parasite drag has increased to a point that it has a considerable effect on speed, fuel consumption, and the like. Further, parasite drag varies directly with the equivalent parasite area (portions of surface which cause drag). Therefore a reduction of 50-70 percent in equivalent parasite area will have a similar effect on parasite drag.

The second consideration or concern at extremely high speeds is the sonic boom phenomenon which occurs at speeds near the speed of sound or Mach I. Sonic boom is generated by the formation of a vacuum or partial vacuum behind the trailing edge of any type of airfoil traveling at or near the speed of sound. The shock waves which are separated by the airfoil at such speeds do not come together fast enough to close immediately behind the trailing edge, thus a vacuum or partial vacuum is left. When the shock waves from above and below subsequently slam together a loud slap or boom is generated.

Considerable efforts have been made to solve the problems of sonic boom, as well as to eliminate parasite drag. To the knowledge of the inventor, however, none of such efforts have been concentrated to a single solution affecting both problems. Most of the drag solutions have been directed toward the shaping of various aircraft sections to eliminate the drag. One attempt to eliminate sonic boom is illustrated in the U.S. Pat. No. 3,776,489 to Wen et al. In the Wen et al. patent one or more air inlets are provided in the wing, elevators, and rudder into which a small amount of air is permitted to enter. The incoming air is routed through a path that is both parallel and transverse to the flight path as it travels from front to rear to simultaneously cool the leading edge of the wings, elevators, and rudder, and to partially fill or spoil the vacuum behind the trailing edges of such airfoils. While the concept of spoiling the vacuum is taught in the Wen et al. patent, that approach leads to further problems especially as far as drag is concerned. No reduction of drag is achieved because any air which may enter the front openings becomes resulting drag because of the curved path which it takes. At such speeds, a backlash is likely to occur from trying to divert the air streams which enter the wings, with the result that structural failure could occur. It is important to note that the Wen et al. patent is not at all concerned with drag. However, any attempt to considerably increase the amount of air taken in through the front openings would definitely involve drag problems.

SUMMARY OF THE PRESENT INVENTION

The present invention, on the other hand, while adopting a concept of spoiling or filling the vacuum, or at least partial vacuum, behind the various sections of the aircraft, utilizes a quite different approach. A plurality (as many as possible) of passageways extend through the wings, elevators, rudder, and even the fuselage. However, these passageways are so designed to extend along a linear path parallel to the flight path. The passageways diverge slightly from front to rear to permit natural expansion of the air, due to heat, as it passes through the airfoil. However, no attempt is made to divert or alter the path of the air. As many passageways as possible are provided through the various aircraft sections, so that a considerable effect on drag may be achieved. It is believed that possibly as much as up to 70 percent or more of the equivalent parasite area of the aircraft may be provided with inlet openings thereby reducing drag considerably. At such supersonic speeds, this up to 70% reduction would have considerable impact on the flight speeds, fuel consumptions, and like considerations.

To achieve these desired results at supersonic speeds, with as little effect as possible on subsonic speeds, each of the openings into the passageways along the leading edges of the aircraft sections is provided with a cover which may be selectively opened or closed. During take-off, landing and at subsonic speeds, the openings may be closed and the drag reducing, sonic boom eliminating passageways opened only at or near supersonic speeds. These covers may be operated electrically, hydraulically, or pneumatically, and may be activated either automatically or manually.

It is therefore an object of the present invention to provide an aircraft configuration which provides considerable decrease in parasite drag at extremely high speeds.

It is another object of the present invention to provide an aircraft configuration which operates to reduce drag, as well as to eliminate sonic boom at speeds approximating and exceeding the speed of sound.

It is another object of the present invention to provide an aircraft configuration of the type described for the reduction of drag and elimination of sonic boom by providing air passageways through sections of the aircraft which extend along a path parallel to the flight path.

Other objects and a fuller understanding of the invention will become apparent from reading the following detailed disclosure of a preferred embodiment in view of the accompanying drawings, in which:

FIG. 1 is a plan view of an aircraft having passageways therethrough in accordance with the present invention;

FIG. 2 is an elevation view of an aircraft according to the present invention;

DETAILED DISCLOSURE OF A PREFERRED EMBODIMENT

Figure 3:
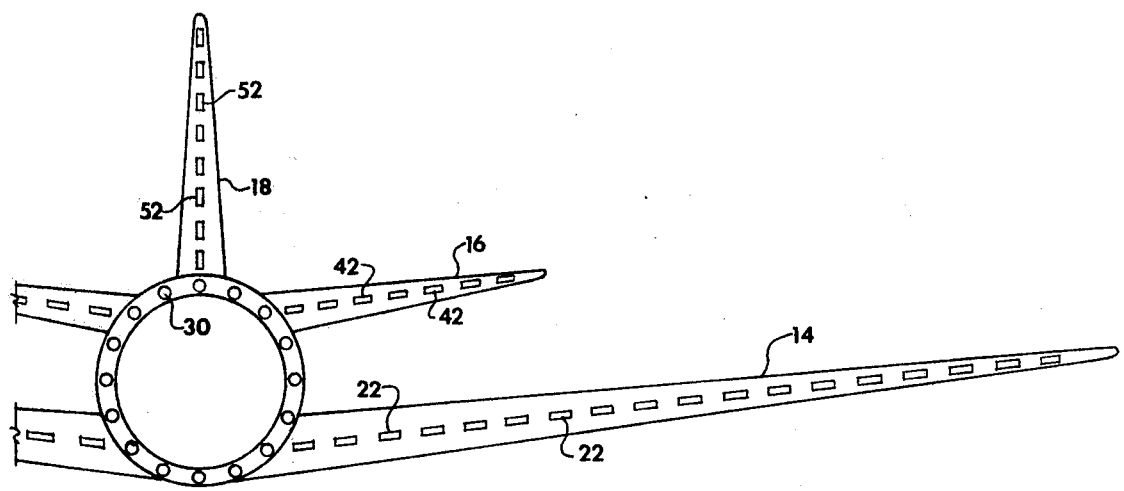
FIG. 3 is a front view of an aircraft according to the present invention.

Turning now to the drawings, in FIG. 1 there is illustrated a conventional aircraft 10 adapted for travel at speeds approaching and exceeding the speed of sound, i.e., both subsonic and supersonic. Such aircraft include a fuselage 12, wings 14, horizontal elevator 16, and rudder 18.

Figure 4:
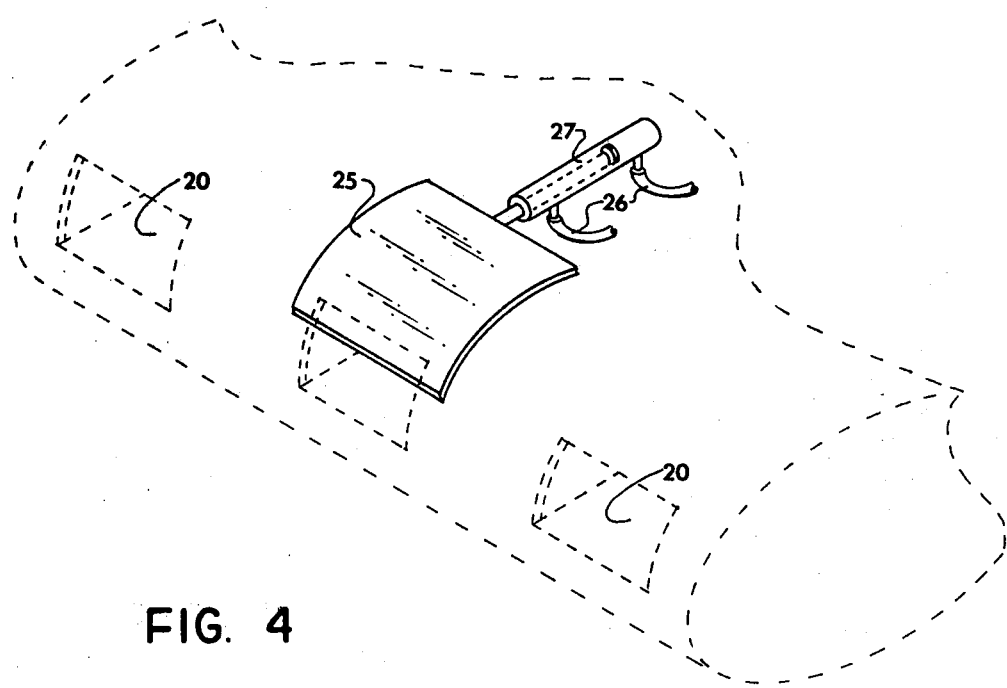
FIG. 4 is an enlarged perspective view, with portions broken away, of a front edge of an airfoil illustrating the manner in which the openings into passageways are selectively covered.
Figure 5:
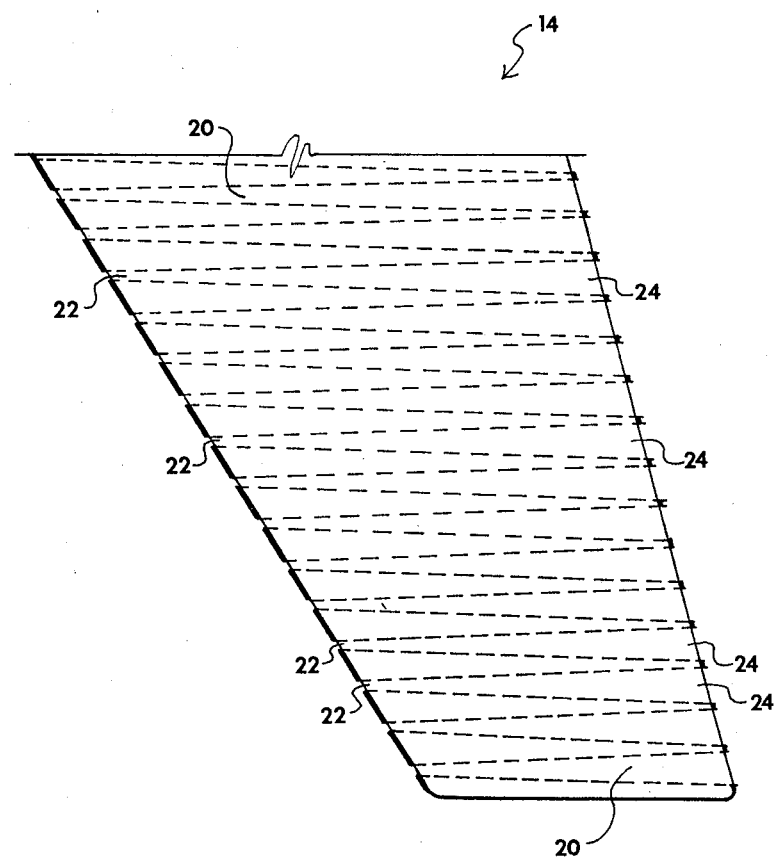
FIG. 5 is an enlarged plan view of the outer end of one of the wings, better illustrating the shape and spacing of the passageways therethrough.

As best shown in FIGS. 1 and 5, a plurality of passageways 20 extend through each wing section 14, the passageways 20 diverging from front to rear. The longitudinal axis of passageways 20 are aligned with the flight path as much as possible. Each passageway 20 is preferably rectangular in cross-section and includes a front opening 22 along the leading edge of each wing 14 and a larger rear opening or outlet 24 along the trailing edge. As will be explained hereinafter with respect to a discussion of FIG. 4, each of the front openings 22 is provided with a slidable cover. The number and size of openings 22, and thus passageways 20, may vary from aircraft to aircraft. However, it is apparent that the number of these openings should be maximized in order to decrease drag as much as possible. It appears that a good size for openings 22 would be either an oval, circle, or rectangle having a major axis of approximately 2 inches diverging to a rear opening 24 having a major axis of approximately 3½ to 4 inches. Preferably, the number and size of openings 20 will be such that at least 10% or more of the surface area of the leading edge of wings 14 will be eliminated by such openings. If desired, it may also prove to be useful to flair slightly outwardly the front of openings 20 to reduce sharp edges at the inlets, and thus induce a greater amount of air to be taken into passageways 20.

In a similar manner fuselage 12 is provided with passageways 30, aligned with the flight path, and having openings 32 at the front end thereof diverging to the rear openings 34. Again, the number and size of these openings should be maximized to achieve the greatest amount of drag reduction possible.

Horizontal elevators 16 are provided with similar passageways 40 having front openings 42 diverging to rear openings 44. Also, rudder 18 is provided with diverging passageways 50 extending between a front opening 52 and rear opening 54.

As illustrated in FIG. 4, each of front openings 22 is provided with a door or cover 25 which may be selectively moved into the position covering the openings, thereby preventing the intake of air during low speeds. The cover 25 may be operated electrically, hydraulically, mechanically, or in any other desired manner. For example, as illustrated in FIG. 4, the cover is connected to a cylinder 27 and hydraulic line 26 which is activated from the cockpit either automatically responsive to air speed or manually to selectively move covers 25 to open openings 22 at high speed flight, then close the same openings 22 during takeoffs, landings, and at lower speeds.

An aircraft 10 constructed in accordance with the disclosure hereinabove is considered to be much more efficient at extremely high speeds, as well as having the added benefit of reducing sonic boom. As air enters passageways 20, 30, 40 and 50 and passes through the corresponding portion of the aircraft 10, the vacuum or partial vacuum therebehind is spoiled or filled with the attendant reduction in sonic boom. Additionally, the passage of air through the airfoil or aircraft sections reduces parasite drag with the attendant result of higher efficiency, faster speeds, lower fuel consumption and the like.

The construction described in FIGS. 1-4 above is illustrative of a preferred embodiment of the invention only. It is obvious that various modifications and changes may be made to the approach taken without departing from the scope of the invention, which is set forth in the following claims.

What is claimed is:

1. In combination with an aircraft of the type having wings, fuselage, horizontal elevators, and a rudder, and which flies at supersonic speeds, a drag reducing configuration with the attendant advantage of reducing the generation of sonic boom noises, where said wings, elevators, and rudder have leading edges and trailing edges, and wherein said fuselage includes a front and rear end, said configuration comprising:
    (a) a plurality of passageways extending parallel to the flight path through at least the wings and fuselage of said aircraft;
    (b) said passageways diverging from front openings along the leading edge of said wings and the front of said fuselage to rear outlets along the trailing edge of said wings and rear end of said fuselage on either side of a longitudinal axis of said passageways;
    (c) said front openings being of such size and so spaced as to considerably reduce the surface area of the leading edge and front end, thereby achieving considerable reduction in parasite drag generated at said leading edge and said fuselage front end.

2. The configuration according to claim 1 wherein said passageways are also provided in at least one of said elevators and rudder.

3. The configuration according to claim 1 wherein at least some of said passageways include covers selectively movable between a first position closing said oepnings and a second position removed from said openings.

4. The configuration according to claim 3 wherein said covers are moved from said first to said second position responsive to an increase in speed to a prescribed level.

5. The configuration according to claim 1 wherein said openings along the wings comprise at least 10% of the surface area of the leading edge thereof.

6. A method for reducing parasite drag and substantially eliminating sonic boom in an aircraft having an airfoil having a leading edge, a trailing edge, and flying at speeds approaching and exceeding the speed of sound comprising the steps of:
    (a) providing a plurality of linear air flow paths through said airfoil extending along longitudinal axes substantially parallel to the flight path of said airfoil and extending from said leading edge to said trailing edge, said air flow paths diverging on either side of said longitudinal axes from said leading edge to said trailing edge;
    (b) providing openings in the leading edge of said airfoil through which said air flow enters said airfoil of such size and number as to reduce the effective surface area of said leading edge by at least 10%;
    (c) providing openings in said trailing edge through which said air flow is discharged from said air flow paths;

(d) alternately opening said leading edge openings as the speed of sound is approached and closing said leading edge openings as the airfoil slows to speeds below the speed of sound;

(e) whereby said air flow paths spoil the partial vacuum which forms behind said trailing edge at sonic and supersonic speeds.

* * * * *